US010347435B2

(12) United States Patent
Wasserfall

(10) Patent No.: US 10,347,435 B2
(45) Date of Patent: Jul. 9, 2019

(54) ELECTROMAGNETIC LINEAR DRIVE ACTUATING MECHANISM FOR A SWITCHING DEVICE

(71) Applicant: Colin Victor Wasserfall, Johannesburg (ZA)

(72) Inventor: Colin Victor Wasserfall, Johannesburg (ZA)

( * ) Notice: Subject to any disclaimer, the term of this patent is extended or adjusted under 35 U.S.C. 154(b) by 0 days.

(21) Appl. No.: 15/760,242

(22) PCT Filed: Nov. 15, 2016

(86) PCT No.: PCT/ZA2016/050046
§ 371 (c)(1),
(2) Date: Mar. 15, 2018

(87) PCT Pub. No.: WO2017/100807
PCT Pub. Date: Jun. 15, 2017

(65) Prior Publication Data
US 2019/0057821 A1   Feb. 21, 2019

(30) Foreign Application Priority Data

Dec. 11, 2015  (ZA) ................................ 2015/09068

(51) Int. Cl.
*H01H 71/70* (2006.01)
*H01H 3/26* (2006.01)
(Continued)

(52) U.S. Cl.
CPC .............. *H01H 3/26* (2013.01); *H01H 3/54* (2013.01); *H01H 71/70* (2013.01); *H04Q 1/145* (2013.01); *H01H 2071/665* (2013.01)

(58) Field of Classification Search
CPC ............ H01H 3/26; H01H 3/54; H01H 3/264; H01H 2071/665; H01H 71/70; Y10T 307/76; Y10T 307/977; H04Q 1/145
See application file for complete search history.

(56) References Cited

U.S. PATENT DOCUMENTS

| 2,905,776 A | 9/1959 | Eisenberg et al. |
| 3,367,193 A | 2/1968 | Leonard |

(Continued)

FOREIGN PATENT DOCUMENTS

| EP | 2672591 | 12/2013 |
| EP | 2677530 | 12/2013 |

OTHER PUBLICATIONS

International Search Report and Written Opinion dated Dec. 12, 2017 in international patent application serial No. PCT/ZA2016/050046.

*Primary Examiner* — Vanessa Girardi
(74) *Attorney, Agent, or Firm* — Haugen Law Firm PLLP

(57) ABSTRACT

This invention relates to a switching device (10). More specifically, the invention relates to a retrofit switching device (10) for mechanically switching a plurality of switches between on and/or off conditions. It is envisaged that the primary application of such invention is for switching circuit breakers configured along one or more rows on a distribution board. The switching device (10) includes a pair of primary parallel guide rails (12,14), a means for anchoring the switching device (10) to a switch covering panel (i.e. a distribution board panel) and a carriage (22), supported across the primary parallel guide rails (12,14) and movable back-and-forth therealong along a first axis, the carriage (22) comprising thereon: (i) a switch engaging formation for operably switching the switches between on and off conditions; and (ii) a primary drive (26) for moving the switch engaging formation back-and-forth along a second axis, wherein the first and second axes are transverse one another. The switching device (10) further includes a secondary drive (28) for moving the carriage along the primary parallel guide rails (12, 14) and operably along the one or more rows of switches, a controller for at least actuating the primary (26)

(Continued)

and the secondary drives (28), and a power source for powering at least the primary drive (26), the secondary drive (28) and the controller.

16 Claims, 5 Drawing Sheets

(51) Int. Cl.
   *H04Q 1/14* (2006.01)
   *H01H 3/54* (2006.01)
   *H01H 71/66* (2006.01)

(56) References Cited

U.S. PATENT DOCUMENTS

| | | |
|---|---|---|
| 3,586,805 A | 6/1971 | Ziegler |
| 3,655,932 A | 4/1972 | Tabares et al. |
| 3,740,680 A | 6/1973 | Schneidinger |
| 3,753,173 A | 8/1973 | Goldberg |
| 3,818,156 A | 6/1974 | Augustyniak |
| 3,919,503 A * | 11/1975 | Friedrichsen ......... H04Q 1/145 324/415 |
| 3,939,725 A | 2/1976 | Fisher |
| 3,985,982 A | 10/1976 | Schneidinger |
| 4,019,166 A | 4/1977 | Lawrence et al. |
| 4,143,254 A | 3/1979 | Heyrana |
| 4,194,182 A | 3/1980 | Martin |
| 4,297,546 A | 10/1981 | Koch |
| 5,306,957 A | 4/1994 | Ellingham et al. |
| 5,955,796 A | 9/1999 | Nilssen |
| 6,326,870 B1 | 12/2001 | Larranaga |
| 6,522,227 B1 | 2/2003 | Mody |
| 6,963,042 B1 | 11/2005 | Kouris |
| 7,189,936 B2 | 3/2007 | Gray, Jr. |
| 9,117,597 B2 * | 8/2015 | McClung ................ H01H 3/02 |
| 2005/0001700 A1 | 1/2005 | Lewis |
| 2005/0242753 A1 | 11/2005 | Morrison |
| 2006/0244557 A1 | 11/2006 | Sorenson |
| 2010/0242645 A1 | 9/2010 | McIlroy et al. |
| 2013/0146431 A1 | 6/2013 | Smith et al. |
| 2013/0335888 A1 | 12/2013 | Cavazos et al. |
| 2014/0262713 A1 | 9/2014 | Kudla |

* cited by examiner

ELECTROMAGNETIC LINEAR DRIVE ACTUATING MECHANISM FOR A SWITCHING DEVICE

BACKGROUND OF THE INVENTION

THIS invention relates to a switching device. More specifically, the invention relates to a retrofit switching device for mechanically switching a plurality of switches between on and/or off conditions. It is envisaged that the primary application of such invention is for switching circuit breakers configured along one or more rows on a distribution board.

In recent times, and particularly in developing countries, power generation and transmission infrastructure is severely underdeveloped, resulting in economical crippling power cuts.

In attempt to avoid such power cuts, many strategies and/or devices have been deployed. Once such strategy is scheduled power shedding, where power to one area is cut during particular times to maintain a constant supply of power to another area. Although effective in avoiding a complete power outage, scheduled power shedding is very inconvenient and disruptive.

Another strategy/device is the roll out of electronic DIN rail circuit breakers, particularly aimed at homeowners. A basic version of such electronic DIN rail circuit breaker includes a timer such that a user can programme the switching on and/or off of a particular circuit in the home (i.e. the geyser or pool pump circuits) during a particular time.

Although relatively effective, purchase of multiple devices to control the various circuits within a household can be expensive. Adding to the expense is the requirement of having to arrange for a professional electrician to install such devices.

A more sophisticated version of such electronic DIN rail circuit breaker further includes an audible alarm to instruct users to switch off certain circuits during peak demand periods. Where the user does not comply within a given timeframe, power to the household will be cut off remotely. Again, such devices are expensive to purchase and install, and do not wholly address the issue of inconvenient and disruptive power cuts.

Another device aimed at addressing the shortcoming of the aforementioned strategies/devices is disclosed in U.S. Pat. No. 6,522,227, which teaches of a remote operated circuit breaker panel having a moving switch engaging actuator controlled by a microprocessor and capable of switching any number of different circuit breakers on the panel.

The disadvantages of this device are firstly, that the cantilevered-like support of the actuator from a drive and/or guide rod may cause misalignment problems between the actuator and the switch being actuated. Secondly, the remote operated circuit breaker panel appears to be a device that wholly replaces an existing distribution board, which of course will be expensive and will require the services of a professional electrician to install.

It is an object of this invention to provide a switching device that addresses the shortcomings of the known prior art devices.

SUMMARY OF THE INVENTION

According to the invention there is provided a switching device including:

a pair of primary parallel guide rails supported on and spaced apart from one another by at least first and second spacers, wherein each of the first and the second spacers are located at or near respective opposing ends of the primary parallel guide rails;

a means for releasably anchoring the switching device to a covering panel of one or more rows switches;

a carriage supported across the primary parallel guide rails and movable back-and-forth therealong along a first axis, the carriage comprising thereon:
  a switch engaging formation for operably switching the switches between on and off conditions; and
  a primary drive for moving the switch engaging formation back-and-forth along a second axis, wherein the first and second axes are transverse one another;

a secondary drive for moving the carriage along the primary parallel guide rails and operably along the one or more rows of switches;

a controller for at least actuating the primary and the secondary drives; and a power source for powering at least the primary drive, the secondary drive and the controller.

Preferably, the first and second axes are perpendicular relative to one another. More preferably, the primary parallel guide rails are operably spaced apart such that they lie on opposite sides of the switches. Most preferably, the primary parallel guide rails are spaced apart by at least about 83 millimeters.

In one embodiment, at least one of the primary parallel guide rails may be a primary threaded elongate cylindrical bar rotatably mounted to the respective spacer and sized and shaped to pass through and engage a threaded guide aperture defined by the carriage, such that a rotary motion imparted to the primary threaded elongate cylindrical bar by the secondary drive causes linear movement of the carriage along the primary parallel guide rails.

In such embodiment, one or more primary guiding rods may run adjacent the threaded elongate cylindrical bar to maintain the carriage in alignment.

In an alternative embodiment, the primary parallel guide rails may be elongate cylindrical bars fixed to the spacers, the carriage being movable back-and-forth along the primary parallel guide rails by a primary belt passing between the carriage and the secondary drive. Typically, the elongate cylindrical bars have a smooth outer surface, or groove formations running linearly along the longitude of such bars.

Generally, the primary belt passes over first head and tail pulleys located respectively near each of the opposing ends of the primary parallel guide rails such that the primary belt takes a substantially closed loop form having a drive side and a return side wherein:

(i) the drive side of the primary belt is fixed to the carriage thereby to pull the carriage back-and-forth between the first head and tail pulleys;

(ii) the return side of the primary belt passes by next to the carriage, or through a primary belt return aperture defined by the carriage; and (iii) the first head pulley is driven to rotate by the secondary drive, which secondary drive is located on one of the first or the second spacers with the first tail pulley located on the other of the first or the second spacers.

Each of the first and the second spacers may extend transversally, preferably perpendicularly, across the respective end of the primary parallel guide rails and have one or more magnetic anchoring means located thereon for releasably mounting the switching device to the covering panel of the switches.

In yet another embodiment of the invention, the at least primary parallel guide rails, the spacers, the carriage, the switch engaging formation, the primary drive and the secondary drive may jointly form a primary structure, with the switching device further including a pair of secondary parallel guide rails, being transverse and preferably perpendicular relative to the primary parallel guide rails.

In such embodiment, one or more secondary guiding rods may run adjacent the threaded elongate cylindrical bar to maintain the primary structure in alignment.

Generally, the secondary parallel guide rails are supported on and spaced apart from one another across the primary structure, with the primary structure being movable back-and-forth along the secondary parallel guide rails by a tertiary drive such that the primary structure and consequentially the switch engaging formation is operably movable from one row of switches over another.

At least one of the secondary parallel guide rails may be a secondary threaded elongate cylindrical bar rotatably mounted to the anchoring means and sized and shaped to pass through and engage a threaded guide bore defined by each of the first and the second spacers, such that a rotary motion imparted to the secondary threaded elongate cylindrical bar by the tertiary drive causes linear movement of the primary structure along the secondary parallel guide rails.

Alternatively, the secondary parallel guide rails are elongate cylindrical bars fixed to the anchoring means, the primary structure being movable back-and-forth along the secondary parallel guide rails by a secondary belt passing between the primary structure and the tertiary drive.

Generally, the secondary belt passes over second head and tail pulleys located respectively near each of the opposing ends of the secondary parallel guide rails such that the secondary belt takes a substantially closed loop form having a drive side and a return side wherein:
 (i) the drive side of the secondary belt is fixed to the primary structure thereby to pull the primary structure back-and-forth between the second head and tail pulleys;
 (ii) the return side of the secondary belt passes by next to the primary structure, or through a secondary belt return aperture defined by the primary structure; and
 (iii) the second head pulley is driven to rotate by the tertiary drive, which tertiary drive is located near one of the opposing ends of the secondary parallel guide rails with the second tail pulley located near the other of the opposing ends thereof.

Typically, the primary structure is movable along a third axis, which third axis is:
 (i) transverse, preferably perpendicular to the first axis; and
 (ii) parallel to the second axis.

The anchoring means may be magnetic anchoring means located at or near each of the opposing ends of the secondary parallel guide rails.

The magnetic anchoring means are preferably permanent magnetics, and/or the belt is toothed. More preferably, the permanent magnetics are rare earth magnets.

Generally, the switch engaging formation is a fork-like formation with first and second engaging prongs, and further wherein operative movement of the switch engaging formation in:
 (i) a first direction causes the first prong to push an actuator of the switch in such first direction thereby to switch the switch to the off condition; and
 (ii) a second direction causes the second prong to push the actuator of the switch in such second direction thereby to switch the switch to the on condition.

Where required, and when operatively returning the switch to the on condition, the switch engaging formation may be actuated to first move in the first direction and thereafter move in the second direction, thereby to reset the switch before returning it to the on condition.

Typically, the controller is pre-programmable with corresponding switch locations, switch conditions and predetermined events such that in use, and on the occurrence of a predetermined event, the controller actuates the primary drive, secondary drive and/or tertiary drive thereby to:
 (i) move the carriage to the corresponding switch location such that the switch engaging formation is positioned over the switch to be switched; and
 (ii) move the switch engaging formation so as to switch the switch to the corresponding on or off condition.

Preferably, the switching device includes one or more sensors for measuring ambient temperature, ambient light intensity, power consumption and/or the operative position of the switch engaging formation, and/or further including a timer independent of or integral with the controller.

More preferably, the controller is a microprocessor and the predetermined event is a specific temperature, light intensity, time, power consumption or command, which command is executable locally at the switching device or remotely via a receiver included in the switching device.

BRIEF DESCRIPTION OF THE DRAWINGS

The invention will now be described in more detail, by way of example only, with reference to the accompanying drawings in which.

DETAILED DESCRIPTION OF THE DRAWINGS

Figure 1:
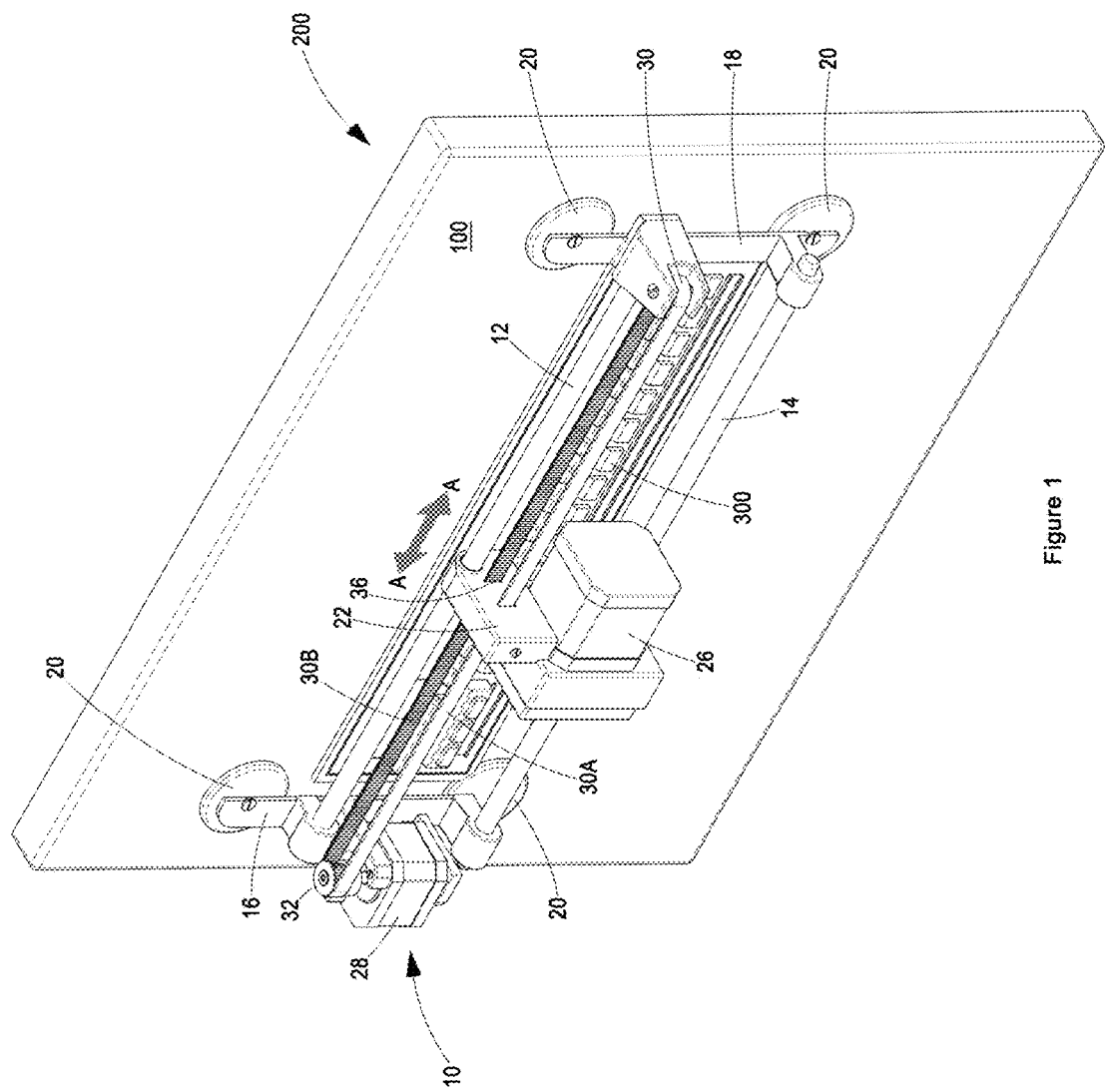
FIG. 1 is a first perspective view of a first embodiment of a switching device in accordance with the present invention mounted to a distribution board.
Figure 2:
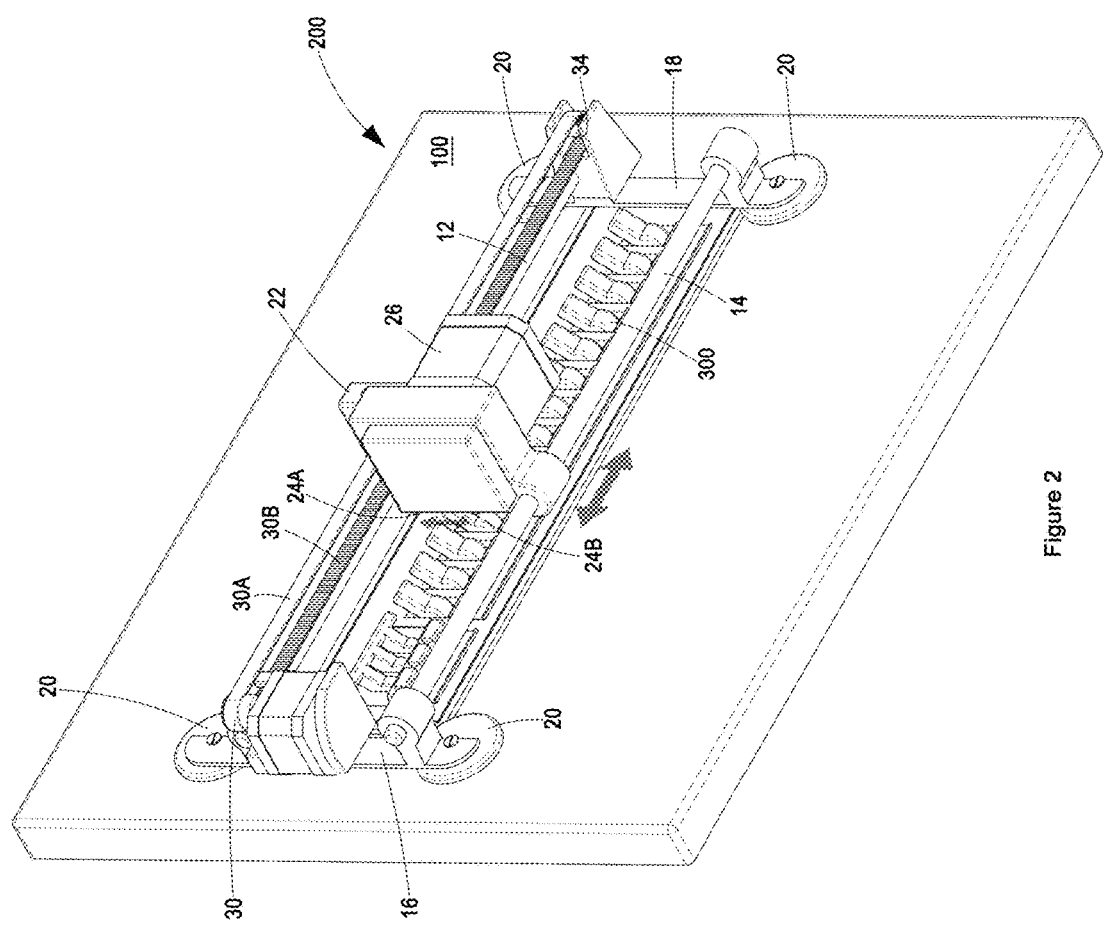
FIG. 2 is a second perspective view of the switching device of FIG. 1.

A switching device according to a preferred embodiment of the invention is designated generally with reference numeral 10 in FIGS. 1 and 2.

The switching device 10 comprises a pair of primary parallel guide rails 12, 14 spaced from one another and supported on first and second spacers 16, 18 each located near respective opposing ends of the pair of primary parallel guide rails 12, 14. The first and the second spacers 16, 18 have located thereon, releasable anchoring means 20, preferably in the form of permanent magnets (more preferably rare earth magnets) for magnetically anchoring the switching device 10 to the covering panel 100 of a distribution board 200.

Although reference in this description will be made to the application of the switching device 10 to a distribution board 200 containing a plurality of circuit breakers 300, it will be appreciated that the switching device 10 may be applied to any other switches or switch-containing mechanisms. Accordingly, reference to the term "circuit breaker" will be understood to include any type of switch.

The switching device 10 further comprises a carriage 22 supported across the primary parallel guide rails 12, 14 and movable back-and-forth therealong along a first axis A-A. To maintain the carriage 22 properly aligned on the primary parallel guide rails 12, 14 it is preferable that such primary parallel guide rails 12, 14 are spaced relative to one another by at least about 83 millimeters such that in use, the primary parallel guide rails 12, 14 lie on opposite sides of a row of circuit breakers 300.

Figure 3C:
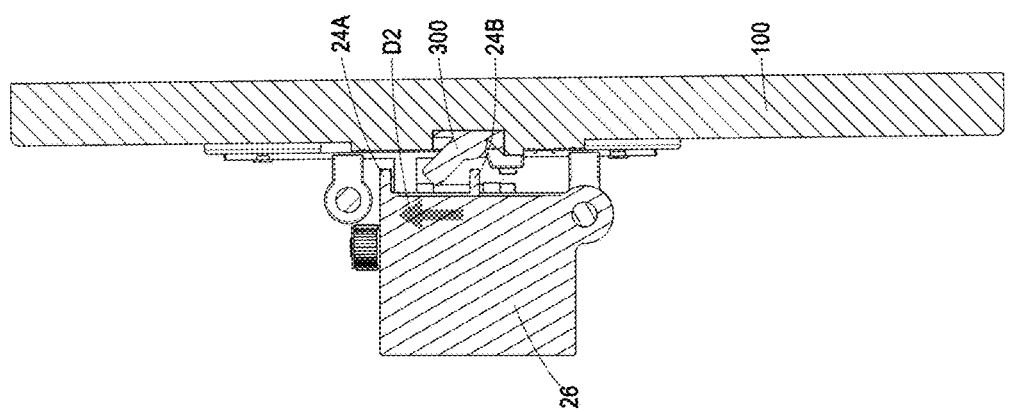
FIG. 3A-C are cross-sectional side view of the switching device and distribution board.
Figure 3B:
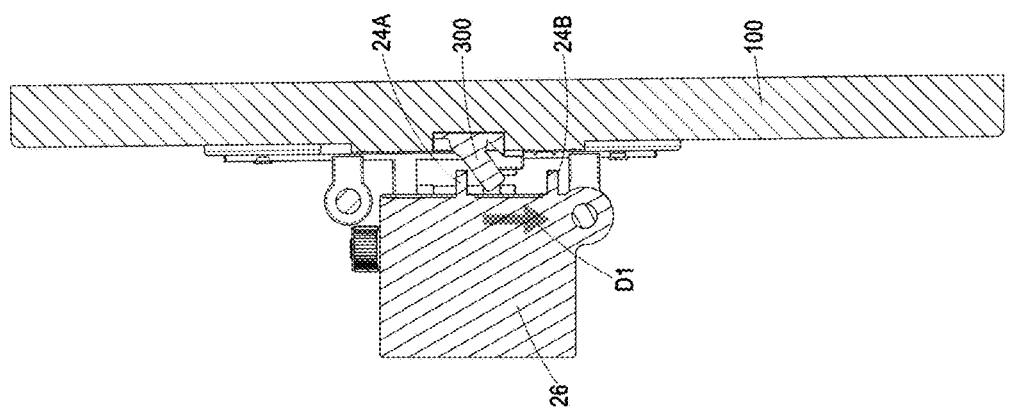
Figure 3A:
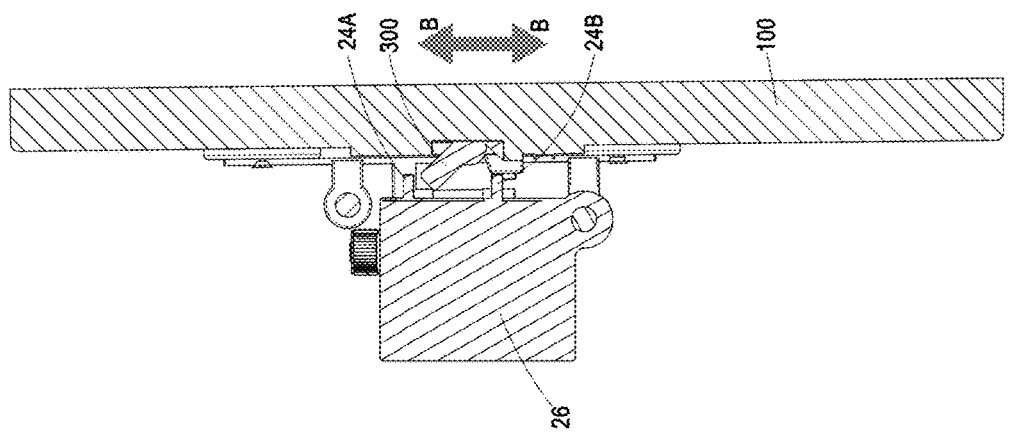

With reference now also to FIGS. 3A to 3C, the carriage 22 comprises thereon a switch engaging formation 24 for operably switching the circuit breakers 300 between on and/or off conditions, as well as a primary drive 26 for moving the switch engaging formation 24 back-and-forth along a second axis B-B, wherein the first and second axes A-A, B-B are transverse and preferably perpendicular one another.

To move the carriage 22 along the primary parallel guide rails 12, 14 and operatively along a row of circuit breakers 300, the switching device 10 further includes a secondary drive 28.

In the preferred illustrated embodiments, the primary parallel guide rails 12, 14 are smooth elongate cylindrical bars fixed to the spacers 16, 18. The carriage 22 is movable back-and-forth along the primary parallel guide rails 12, 14 by a primary belt 30, preferably toothed, passing between the carriage 22 and the secondary drive 28.

The primary belt 30 passes over first head and tail pulleys 32, 34 located respectively near each of the opposing ends of the primary parallel guide rails, more particularly located respectively at the first and second spacers 16, 18, such that the primary belt 30 takes a substantially closed loop form having a drive side 30A and a return side 30B.

The drive side 30A of the primary belt 30 is fixed to the carriage 22 thereby to pull the carriage 22 back-and-forth between the first head and tail pulleys 32, 34. The return side 30B of the primary belt passes through a primary belt return aperture 36 defined by the carriage 22.

The first head pulley 32 is driven to rotate by the secondary drive 28, which secondary drive 28 is typically a stepper motor and located on the first spacer 16, with the first tail pulley 34 located on the second spacer 18.

It will be appreciated that the switching device 10 further includes a controller 50 preferably in the form of a pre-programmable microprocessor, for at least actuating the primary and secondary drives 26, 28.

Figure 5:
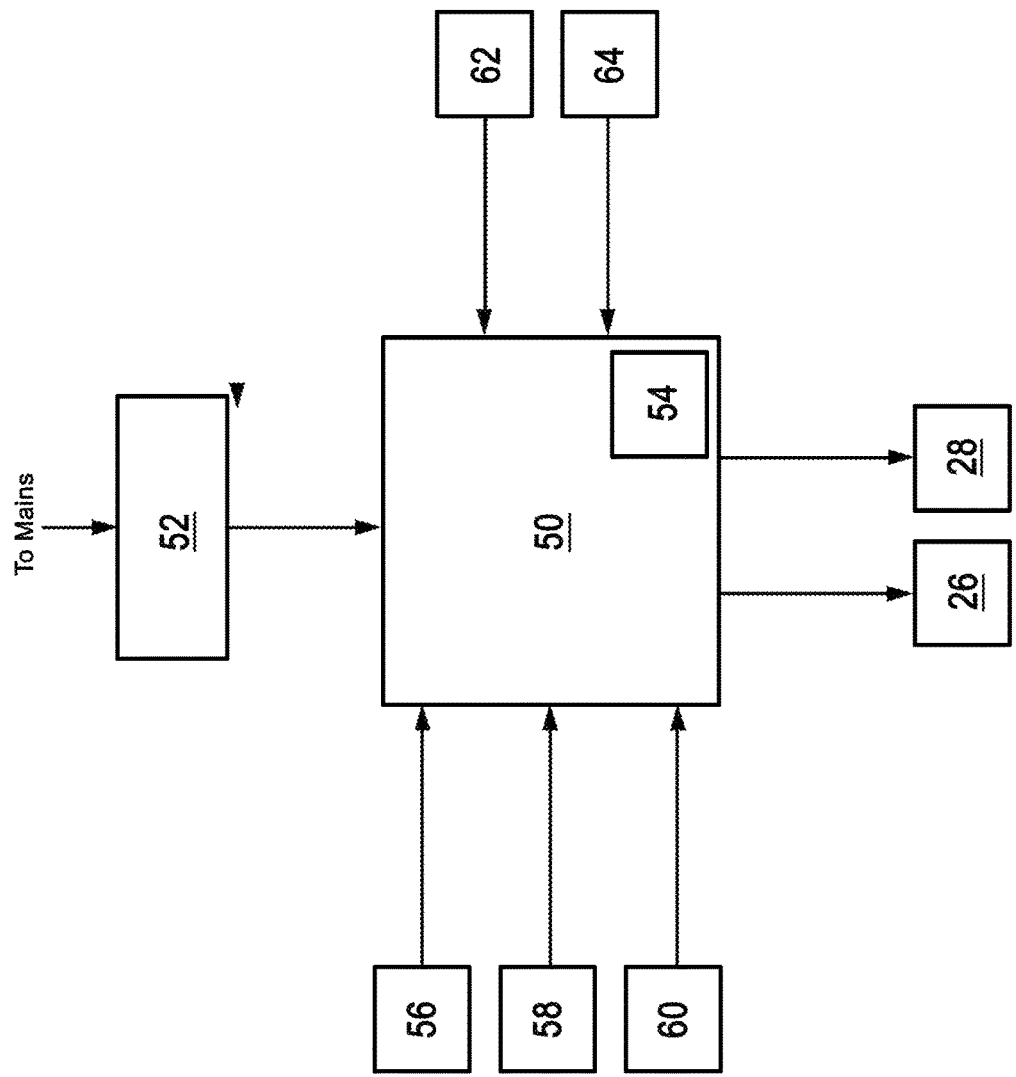
FIG. 5 is a schematic diagram of controller circuitry of the switching device in accordance with FIG. 1.

Furthermore, and with reference to FIG. 5, the switching device 10 is capable of being powered by electrical mains or an independent power source 52 (not shown).

Following basic instructions, a user (without the need for the services of a professional electrician) is capable of retrofitting the switching device 10 onto the distribution board 200 by simply magnetically anchoring the switching device 10 on to the covering panel 100 such that:

(i) the primary parallel guide rails 12, 14 lie on either side of the circuit breakers 300; and (ii) the actuator levers of the circuit breakers 300 lie between the fork-like prongs 24A, 24B of the switch engaging formation 24;

as illustrated in FIGS. 1 to 3.

It will be appreciated that the anchoring means 20, although preferably having a strong magnetic force, must allow for the user to make small positional adjustments of the switching device 10 relative to the control panel 100.

Once correctly positioned, the user may then begin to program the controller. The programming of the controller may include: calibrating the identities and locations of the various circuit breakers; the predetermined events that will cause the of circuit breakers to be switched between on and/or off conditions; and the on/off condition to which a circuit breaker should be set on the occurrence of a specific predetermined event.

The predetermined events may be predetermined times, ambient temperatures, ambient light conditions, power consumption or any other parameter that can be measured and/or monitored. It will be appreciated that in order to measure or monitor the aforementioned parameters, the switching device 10 must include a timer 54 and one or more relevant sensors, i.e. temperature sensor 56, light sensor 58, and power consumption sensor 60. Furthermore, the switching device 10 may also include sensors (62,64) to monitor the position and/or movement of the switch engaging formation 24.

Once programmed, the switching device 10 is ready to operate. For the purposes of the describing the operation of the switching device, let us assume that the predetermined event is time based.

In use, and on the occurrence of a predetermined time, the controller is triggered to actuate operation of the secondary drive 28 thereby to move the carriage 22 and consequentially the switch engaging formation 24 along the first axis A-A to a position coinciding with the location of the corresponding circuit breaker 300 to be switched on the occurrence of such predetermined time, as illustrated in FIGS. 1 and 2.

With the switch engaging formation 24 positioned over the corresponding circuit breaker location, the prongs 24A, 24B thereof will be located on either side of the actuator lever of the relevant circuit breaker 300 as illustrated in FIG. 3.

In this position, and with reference specifically to FIGS. 3A to 3B, the controller actuates the primary drive 26 thereby to move the switch engaging formation 24 along the second axis B-B in either:

(i) a first direction "D1" to cause the first prong 24A to push the actuator of the circuit breaker 300 in such first direction thereby to switch it to an off condition; or (ii) a second direction "D2" to cause the second prong 24B to push the actuator of the circuit breaker 300 in such second direction thereby to switch it to the on condition.

Figure 4:
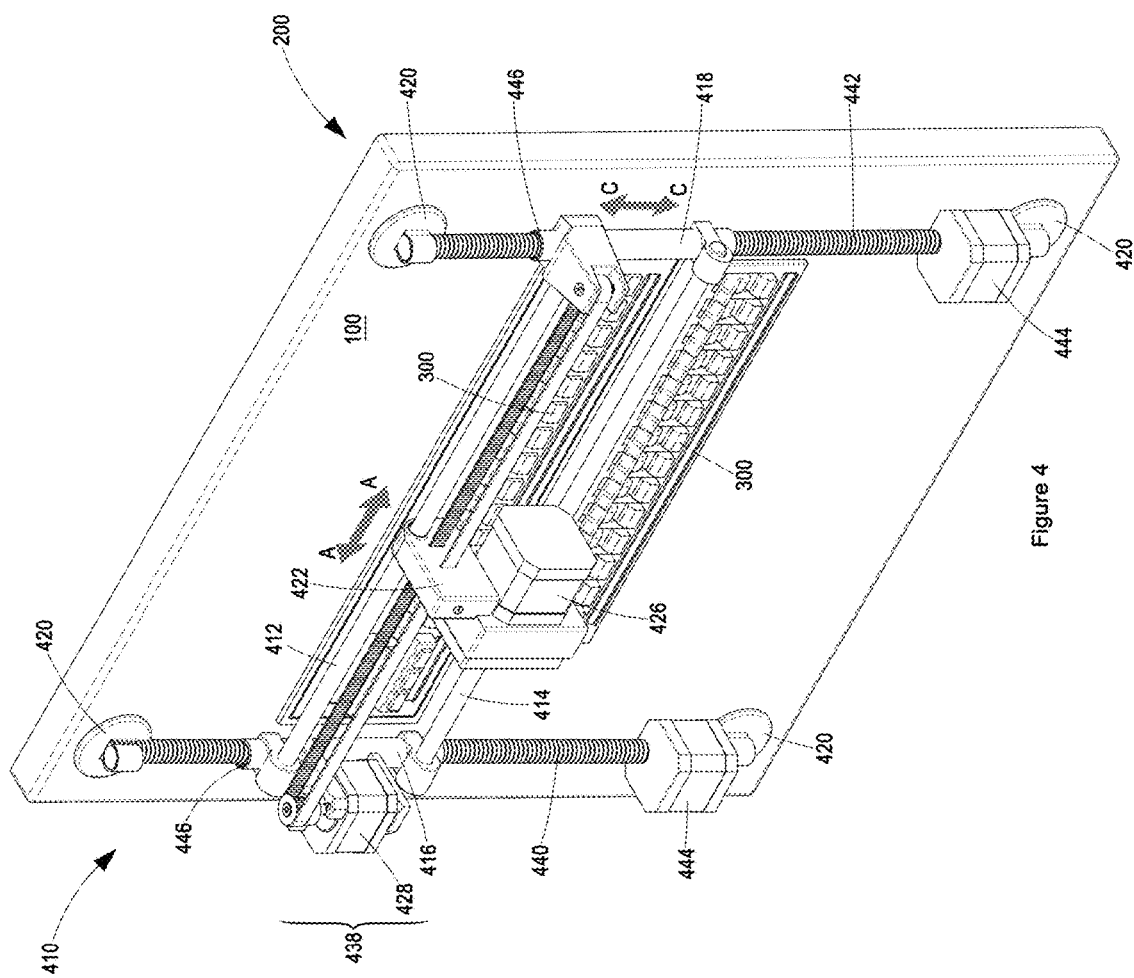
FIG. 4 is a perspective view of a second embodiment of a switching device in accordance with the present invention mounted to a distribution board.

It will be appreciated that some distribution boards 200 many have multiple rows of circuit breakers 300. To accommodate such distribution boards 200, it is envisaged that the switching device 410 may take an alternative embodiment as illustrated in FIG. 4.

In such alternative embodiment, and with like references relating to like parts, the primary parallel guide rails 412, 414, the spacers 416, 418, the carriage 422, the switch engaging formation, the primary drive 426 and the secondary drive 428 jointly form a primary structure 438 movable along a pair of secondary parallel guide rails 440, 442 being transverse and preferably perpendicular to the primary parallel guide rails 412, 414.

The secondary parallel guide rails 440, 442 are anchored to the covering panel 100 by magnetic anchoring means 420 located at each of its ends, and spaced apart from one another across the primary structure 438, which primary structure 438 is movable back-and-forth along the secondary parallel guide rails 440, 442 along a tertiary axis C-C, being perpendicular to and parallel with the first and second axes A-A, B-B respectively.

Tertiary drives 444 rotate the threaded secondary parallel guide rails 440, 442 which cause the primary structure 438 to move linearly therealong as a result of threaded engagement of the secondary parallel guide rails 440, 442 with threaded guide bores 446 defined by each of the first and the second spacers 416, 418.

It will be appreciated that in use, the controller and power source would similarly actuate and power the tertiary drives 444 as it does the primary and secondary drives 426, 428.

Although the invention has been described above with reference to preferred embodiments, it will be appreciated that many modifications or variations of the invention are possible without departing from the spirit or scope of the invention.

For example, the primary parallel guide rails may be a threaded instead of smooth, driven through rotary motion by the secondary drive and co-operative with one or more primary guiding rods running adjacent the threaded parallel guide rails to maintain the carriage in alignment.

Instead of being threaded, the secondary parallel guide rails may be smooth with the primary structure driven to move through a belt and pulley arrangement much the same as the drive described herein for the movement of the carriage.

The invention claimed is:

1. A switching device including:
   a pair of primary parallel guide rails supported on and spaced apart from one another by at least first and second spacers, wherein each of the first and the second spacers are located at or near respective opposing ends of the primary parallel guide rails;
   a means for releasably anchoring the switching device to a covering panel of one or more rows switches;
   a carriage supported across the primary parallel guide rails and movable back-and-forth therealong along a first axis, the carriage comprising thereon:
      a switch engaging formation for operably switching the switches between on and off conditions; and
      a primary drive for moving the switch engaging formation back-and-forth along a second axis, wherein the first and second axes are transverse one another;
   a secondary drive for moving the carriage along the primary parallel guide rails and operably along the one or more rows of switches;
   a controller for at least actuating the primary and the secondary drives; and
   a power source for powering at least the primary drive, the secondary drive and the controller;
   characterised in that the primary parallel guide rails are elongate cylindrical bars fixed to the spacers, the carriage being movable back-and-forth along the primary parallel guide rails by a primary belt passing between the carriage and the secondary drive.

2. A switching device according to claim 1, wherein the primary belt passes over first head and tail pulleys located respectively near each of the opposing ends of the primary parallel guide rails such that the primary belt takes a substantially closed loop form having a drive side and a return side wherein:
   (i) the drive side of the primary belt is fixed to the carriage thereby to pull the carriage back-and-forth between the first head and tail pulleys;
   (ii) the return side of the primary belt passes by next to the carriage, or through a primary belt return aperture defined by the carriage; and
   (iii) the first head pulley is driven to rotate by the secondary drive, which secondary drive is located on one of the first or the second spacers with the first tail pulley located on the other of the first or the second spacers.

3. A switching device according to claim 2, wherein each of the first and the second spacers extend transversally across the respective end of the primary parallel guide rails and have one or more magnetic anchoring means located thereon for releasably mounting the switching device to the covering panel of the switches.

4. A switching device according to claim 3, wherein:
   (i) the magnetic anchoring means are permanent magnetics;
   (ii) the belt is toothed; or
   (iii) the magnetic anchoring means are permanent magnetics and the belt is toothed.

5. A switching device according to claim 2, wherein at least the primary parallel guide rails, the spacers, the carriage, the switch engaging formation, the primary drive and the secondary drive jointly form a primary structure, and further wherein the switching device includes a pair of secondary parallel guide rails, being transverse relative to the primary parallel guide rails, and supported on and spaced apart from one another across the primary structure, the primary structure being movable back-and-forth along the secondary parallel guide rails by a tertiary drive such that the primary structure and consequentially the switch engaging formation is operably movable from one row of switches over another.

6. A switching device according to claim 5, wherein at least one of the secondary parallel guide rails is a secondary threaded elongate cylindrical bar rotatably mounted to the anchoring means and sized and shaped to pass through and engage a threaded guide bore defined by each of the first and the second spacers, such that a rotary motion imparted to the secondary threaded elongate cylindrical bar by the tertiary drive causes linear movement of the primary structure along the secondary parallel guide rails.

7. A switching device according to claim 6, wherein the secondary parallel guide rails are elongate cylindrical bars fixed to the anchoring means, the primary structure being movable back-and-forth along the secondary parallel guide rails by a secondary belt passing between the primary structure and the tertiary drive.

8. A switching device according to claim 7, wherein the secondary belt passes over second head and tail pulleys located respectively near each of the opposing ends of the secondary parallel guide rails such that the secondary belt takes a substantially closed loop form having a drive side and a return side wherein:
   (i) the drive side of the secondary belt is fixed to the primary structure thereby to pull the primary structure back-and-forth between the second head and tail pulleys;
   (ii) the return side of the secondary belt passes by next to the primary structure, or through a secondary belt return aperture defined by the primary structure; and
   (iii) the second head pulley is driven to rotate by the tertiary drive, which tertiary drive is located near one of the opposing ends of the secondary parallel guide rails with the second tail pulley located near the other of the opposing ends thereof.

9. A switching device according to claim 8, wherein the primary structure is movable along a third axis, which third axis is:
(i) transverse to the first axis; and
(ii) parallel to the second axis.

10. A switching device according to claim 9, wherein the anchoring means are magnetic anchoring means located at or near each of the opposing ends of the secondary parallel guide rails.

11. A switching device according to claim 10, wherein:
(i) the magnetic anchoring means are permanent magnetics;
(ii) the belt is toothed; or
(iii) the magnetic anchoring means are permanent magnetics and the belt is toothed.

12. A switching device according to claim 11, wherein the switch engaging formation is a fork-like formation with first and second engaging prongs, and further wherein operative movement of the switch engaging formation in:
(i) a first direction causes the first prong to push an actuator of the switch in such first direction thereby to switch the switch to the off condition; and
(ii) a second direction causes the second prong to push the actuator of the switch in such second direction thereby to switch the switch to the on condition.

13. A switching device according to claim 12, wherein the controller is pre-programmable with corresponding switch locations, switch conditions and predetermined events such that in use, and on the occurrence of a predetermined event, the controller actuates at least one of the primary drive, the secondary drive and the tertiary drive thereby to:
(i) move the carriage to the corresponding switch location such that the switch engaging formation is positioned over the switch to be switched; and
(ii) move the switch engaging formation so as to switch the switch to the corresponding on or off condition.

14. A switching device according to claim 13 including one or more sensors for measuring at least one of the ambient temperature, ambient light intensity, power consumption and the operative position of the switch engaging formation.

15. A switching device according to claim 14, wherein the controller is a microprocessor and the predetermined event is a specific temperature, light intensity, time, power consumption or command, which command is executable locally at the switching device or remotely via a receiver included in the switching device.

16. A switching device according to claim 14, further including a timer independent of or integral with the controller.

* * * * *